Sept. 5, 1967    E. NYFFELER    3,339,889
ATTACHMENT OF ROTOR BLADING FOR AXIAL FLOW TURBO-MACHINES
Filed Nov. 8, 1966    3 Sheets-Sheet 3

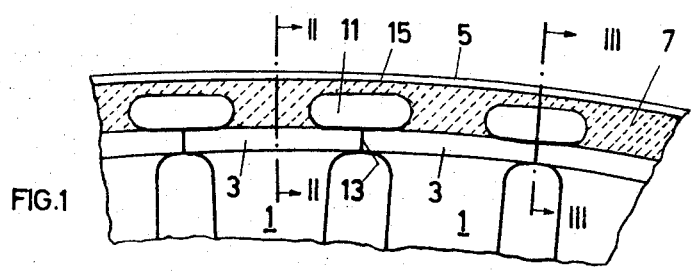
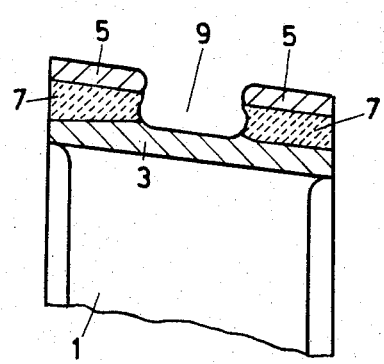
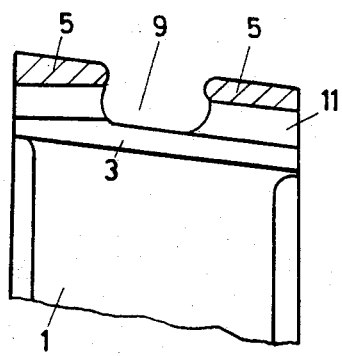
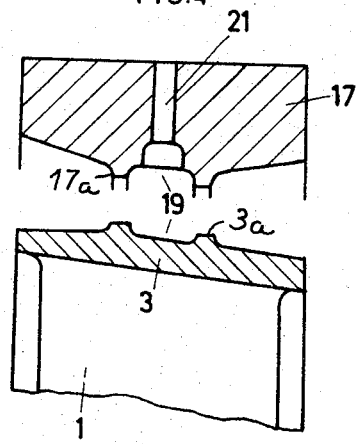
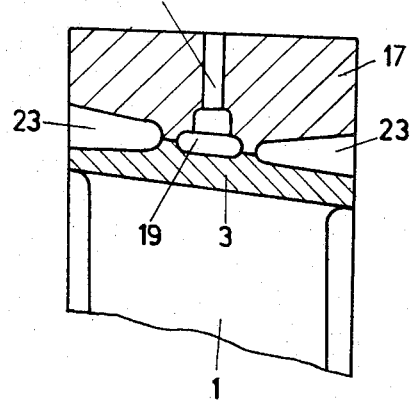

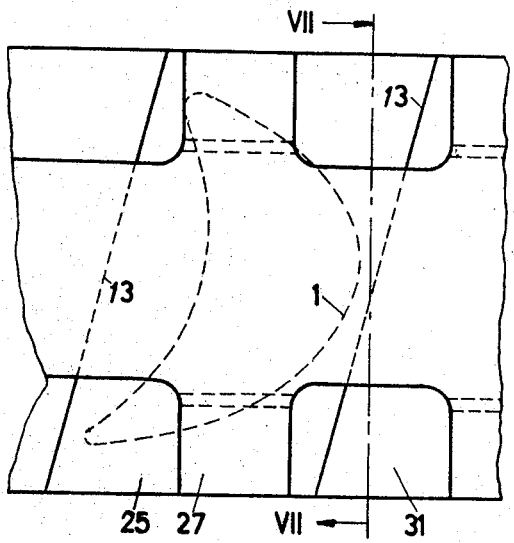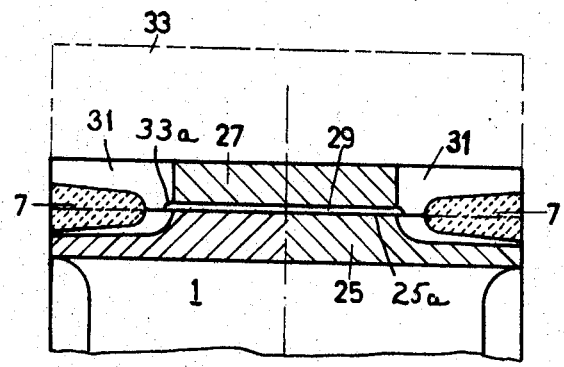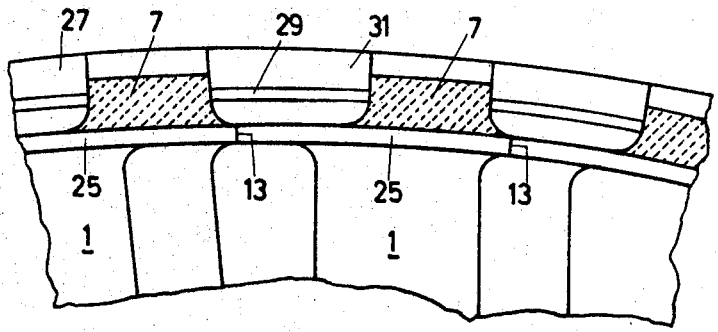

Inventor
Ernst Nyffeler
By Pierce, Scheffler & Parker
Attorneys

United States Patent Office 3,339,889
Patented Sept. 5, 1967

3,339,889
ATTACHMENT OF ROTOR BLADING FOR
AXIAL FLOW TURBO-MACHINES
Ernst Nyffeler, Wettingen, Switzerland, assignor to Aktiengesellschaft Brown, Boveri & Cie, Baden, Switzerland, a joint-stock company
Filed Nov. 8, 1966, Ser. No. 592,917
Claims priority, application Switzerland, Dec. 7, 1965, 16,847/65
7 Claims. (Cl. 253—77)

ABSTRACT OF THE DISCLOSURE

A blade interconnecting structure for rotor blading of an axial flow turbo-machine of the type wherein the blades of a row include enlarged head portions which establish a cylindrical array of mutually abutting cover plates. These cover plates are interconnected by means of a cover band which surrounds the cover plates and which is secured to the plates by two axially spaced circumferentially extending welding seams. A circumferential channel is provided intermediate the cover band and the two welding seams, and circumferentially spaced, axially extending, openings extend through the welding seams in axial alignment with the abutting faces of adjacent cover plates and communicate with the circumferential channel.

The present invention relates to axial flow turbo-machines such as steam or gas turbines and more particularly to an improved arrangement for interconnection of the blades on the rotor element of the machine at their head-ends which are enlarged to establish cover plates in the sense that a cover band is established which forms a ring about all of the blades in a particular row.

It is known to interconnect the rotor blading by means of metallic cover sheets which are riveted to the blades. When the blades are made from a single forging including their enlarged heads which terminate in cover plates, the faces of the cover plates are either welded to each other to interconnect adjacent blading and establish the blading cover, or the faces of these cover plates are held together in a mutually pressing engagement by the manner in which the blading is assembled in the rotor so that the cover plate of each blade exerts a pressure against the cover plate of the blades adjacent thereto. There is another possibility in that an additional cover band connected to a plurality of the cover plates is applied to the blading. Normally, the cover band is riveted to the blading for this purpose.

With a riveted type of connection, the rivets are always subject to very great stresses because the rivets must carry the centrifugal forces of the cover band as well as the changing bending moments which arise, for example, from the steam forces. In addition, a riveting operation results in localized hardening of the metal, which is likewise a disadvantage in that it decreases the durability of the rivet.

The principal object of this invention is to provide an improved construction for establishing the desired cover band for the rotor blading and more particularly to an improved method for establishing the necessary connection between the cover plate portions of the blading and the cover band and which can be produced in a simple manner. In accordance with the invention, the blading connection is characterized in that the cover band is joined to the cover plates at one or both axial side surfaces by at least one welding seam which extends in a circumferential direction.

In accordance with a further advantage to be derived from the invention, a free space extending over a part of the axial width of the cover plates and running in a circumferential direction can be provided, this free space connecting with the inner ends of axially directed passageways which lead from this free space to each side of the blading, and being located partly in the welding seam at the abutting faces of the cover plates of adjacent blades.

Various embodiments of the invention will be described hereinafter in detail and are illustrated in the accompanying drawings wherein:

FIG. 1 is a fragmentary view of a part of one blade row on the turbine rotor transverse to the rotational axis, the view showing only the radially outer portions of the blading with their enlarged heads which establish the cover plates, together with the cover band which is welded to the cover plates in accordance with the invention;

FIG. 2 is a sectional view taken on line II—II of FIG. 1;

FIG. 3 is also a sectional view taken on line III—III of FIG. 1;

FIG. 4 is an axial sectional view of the blading at a first phase of the method utilized for welding the cover band to the cover plate part of the blading;

FIG. 5 is a view similar to FIG. 4 showing a second phase of the method for welding the cover band to the cover plates.

FIG. 6 is a fragmentary view in plan of another vane group showing a modified embodiment of the invention;

FIG. 7 is a sectional view taken on line VII—VII of FIG. 6;

FIG. 8 is a fragmentary view transverse to the rotational axis showing the vane group of FIG. 6;

Figure 9:
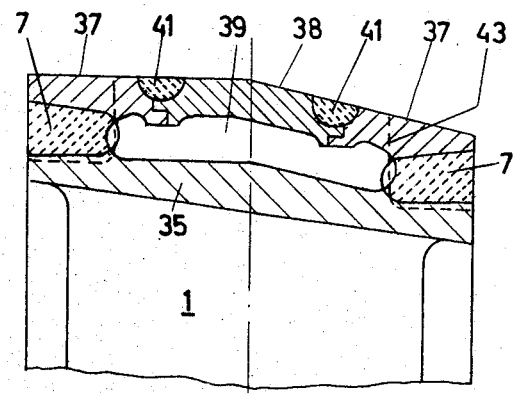
FIG. 9 is a sectional view showing still another embodiment of the invention.

Referring now to the embodiment of the invention as illustrated in FIGS. 1 to 5, several blades of one blading row of the turbine rotor are indicated at 1. The foot portions of these blades and their manner of attachment in a circumferential groove provided in the rotor for such purpose has not been illustrated since the invention is directed to the radially outer portions of the blades including their enlarged, integral head parts 3 which have a four-sided configuration and can be referred to as cover plates. As seen in FIG. 1, the side faces of the cover plates 3 of adjacent blades abut one another at 13, and a cover band 5 is attached to the cover plates of all blades in the row by means of two axially spaced, circumferentially extending, welding seams 7.

As seen from FIG. 2, a circumferentially extending channel 9 is provided in the cover band 5 intermediate the sides thereof and this channel also extends radially inward so as to reach a part of the outer surface of cover plates 3.

As seen from FIGS. 1 and 3, axially extending slots 11 reach inwardly from each side to communicate with the circumferential channel 9 and these slots are located in alignment with the junctions 13 of the side faces of adjacent cover plates. Moreover, as will be seen from FIG. 1, these slots extend radially inward beyond the radially inner limits of the welding seams 7 such that the outer faces of the cover plates no longer show any welding material at the radially inner sides of the slots.

The circumferential channel 9 and the axial slots 11 which intersect the same have the following purpose and function. Cover band 5 is subjected to a high degree of stress created by centrifugal forces arising from high speed rotation of the rotor, and additional stresses are imposed on the band by the force of the steam itself. Consequently, band 5 must have a comparatively massive design to withstand high temperatures which results in comparatively large bending stress in a radial direction. These bending stresses lead to a non-uniform engagement of the foot portions of some of the blades in the rotor groove as a result of the centrifugal force so that the centrifugal force and steam force exerted on those particular blades are deflected to the neighboring blades. The total stress on the blade, in the cross-section of the rotor groove for the blade foot is composed of the mean stress and the changing stress by the steam force and is required to stay within the maximum permissible stress. Now, if the foot portion of one blade makes no contact with the fastening projection provided in the rotor groove, the centrifugal force acting on the blade is transmitted by way of the cover band to the neighboring blades whose mean stress value therefore rises. The total stress on at least one neighboring blade may then increase beyond the permissible stress value for which the blade is designed with the result that this blade may fracture.

The structural arrangement shown in FIGS. 1–3, constitutes a blade interconnection at band 5 which is elastic enough in the radial direction to assure that the fastening protuberances on the foot portions of all blades in the rotor groove carry evenly. On the other hand, however, the blade interconnection is stiff enough in the axial as well as in the tangential direction to transmit the steam forces of the individual blades evenly to the entire blade packet and to the rotor shaft.

It is evident from FIG. 1 that cover band 5 in the area of butt joints 13 between the sides of adjacent cover plates establish a bridge 15 which makes the slight radial, and necessary expansion of the blades 1 in cover band 5 possible. The thickness of this bridge is so selected that its stress under the centrifugal force imposed thereon by one blade reaches at least the elastic limit of the material. In this manner, the desired effect of uniform contact as between the blade feet and rotor groove is obtained. Due to slots 11, the connection-making welding material is removed at the abutting surfaces 13 of adjacent cover plates.

FIGS. 4 and 5 illustrate two succeeding phases of the operation involved in welding the cover band to the cover plates to produce the construction shown in FIGS. 1–3.

After all of the blades of one row have been fastened by their foot portions into the rotor groove, the upper cylindrical surface formed by the cover plates is machined to the contour shown in FIG. 4 so as to establish two axially spaced cylindrical ribs 3a. A ring 17, machined to the configuration illustrated is then shrunk onto the cover plate ring so as to produce the structure depicted in FIG. 5. It will be noted that ring 17 is also provided on its inner periphery with axially spaced cylindrical ribs 17a which have the same spacing as the ribs 3a thus to develop, as shown in FIG. 5 a circumferentially extending hollow space 19 which serves as a channel for gas introduced and removed during the subsequent welding operation, there being provided in the ring 17 a plurality of circumferentially spaced radial holes 21 for inflow and outflow of gas which communicate with the space 19.

After ring 17 has been shrunk on the cover plates 3, it is welded to these plates by means of two axially spaced, circumferentially extending seams 23. After welding, ring 17 is then machined down to establish the circumferential channel 9 and the lateral slots 11 milled out of the weld material and adjoining parts of ring 17 and cover plates 3. The finished product then has the structure shown in FIGS. 1–3, the machined down ring 17 of course then becoming the finished cover band 5.

A somewhat modified structure and mode of making the same are illustrated in FIGS. 6–8. Referring now to these views, each blade 1 is seen to include an integral cover plate 25 having the configuration of a parallelogram. A continuous cover band 27 extending in the circumferential direction is joined to the cover plates 25 by two axially spaced welding seams 7 which extend circumferentially at each side of the band and cover plates. A circumferentially extending channel 29 is provided between the cover band 27 and cover plates 25 of the blades. Milled-in at the abutting faces 13 of adjacent cover plates from each side are recesses 31 from which are excluded the weld material. In addition, these recesses 31 extend to and communicate with the circumferential channel 29 so as to establish a free space in the axial direction between the cover plates 25 and cover band 27 at the abutting faces 13 of the cover plates. This produces a bridge-like connection for the blade ends or their cover plates, thus making possible radial length equalization for the blades. However, at the same time, adequate stiffness of cover band 27 joined to cover plates 25 by the welding seams 7 in the axial and tangential directions is assured.

To produce the bladehead-cover band structure shown in FIGS. 6–8, all of the blades of one row are first inserted into the rotor groove and secured therein. The cover plate parts 25 of the blades are then machined to the configuration shown in FIG. 7 which includes a comparatively broad circumferentially extending plateau 25a. A ring 33 having an esesntially rectangularly configured cross-section as shown by the dashed line in FIG. 7 is then shrunk onto the machined cylindrical assembly of cover plates 25 of all blades, it being noted that the radially inner face of ring 33 includes a broad, circumferentially extending recess 33a located in radial spaced relation to and opposite the plateau part 25a of the cover plates thus to establish the channel 29. Ring 33 is then welded along two axially spaced seams 7 to the cover plates 25. Finally, ring 33 is then machined down to the final cover band thickness denoted by numeral 27, and the oppositely disposed lateral recesses 31 are milled into cover band 27 and cover plates 25, the weld material being of course removed from these areas during the milling process.

Figure 10:
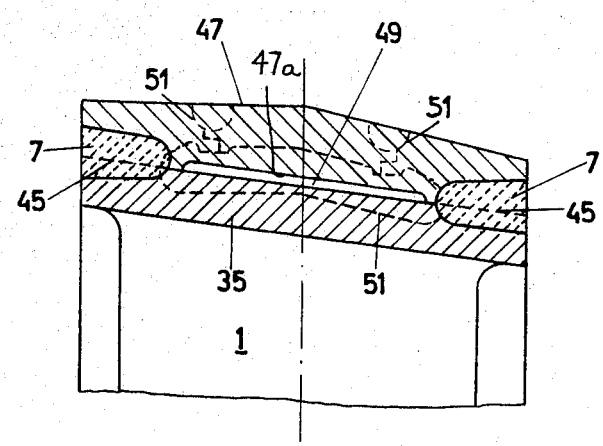
FIG. 10 is a view similar to FIG. 9 showing the construction of the latter at one phase of its manufacture.

A third embodiment of the invention is illustrated in FIGS. 9 and 10. It will be seen from a comparison between FIG. 9 and FIG. 8 that the circumferentially extending channel 39 provided between the cover plates 35 of the blades and cover band 37, 38 in FIG. 9 has a configuration different from that of channel 29 in FIG. 8. However, the design of the laterally extending openings terminating at channel 39 is the same in that they have also the shape of recesses 43 located at the abutting faces of adjacent cover plates 35 and extend in an axial direction, opening to the outside.

The dimension of channel 39 in the axial direction is so large that the welding seams 7 are cut into it thus achieving less stress on the separating point between the welding seams 7 and cover band 37, 38 or the cover plates 35, respectively, at the incoming side of the welding joint.

Cover band 37, 38 is comprised of three parts, namely, two outer bands 37 and an intermediate band 38. The latter is inserted into the two outer bands 37 and joined to them by circumferentially extending welding seams 41. The necessity for this particular cover band structure follows from the fact that channel 39 actually cuts into the axially inner sides of the welding seams 7, and therefore has a greater axial expanse than channel 29 shown in FIG. 7, as will now be explained.

As may be seen from FIG. 10, the cover plates 35 of blades 1 inserted into the rotor groove are machined, i.e. turned down in conformity with line 45 to produce the blade connection illustrated in FIG. 9. A ring 47 is then shrunk onto the cover plates 35 and welded to them by the two axially spaced welding seams 7. Machined into ring 47 at its radially inner side facing the blades 1 is a groove 47a which, together with the confronting surface of cover plates 35 establishes a hollow space 49 into which gas can be introduced, and removed, during the welding operation, through circumferentially spaced, radial holes, not illustrated. Ring 47, cover plates 35 and welding seams 7 are now machined down to establish the contour indicated by numeral 51. Next, cover band sectors extending over several blades, for example seven, and having a profile corresponding to the center cover band 38 shown in FIG. 9 are inserted and welded to the two outer cover band parts 37 (FIG. 9) along the two illustrated circumferential seams 41. Finally, lateral recesses 43 whose positions and dimensions are the same as for the recesses 31 in FIG. 6, are milled into the cover plates 35, welding seams 7 and the two outer cover band parts 37.

Since the blade connection which has been described has a sufficient radial elasticity, an intermediate layer can be applied to the supporting surfaces in the rotor groove for the corresponding fastening surface parts of the blade feet, thus achieving a uniform stress load on these supporting surfaces.

I claim:

1. A blade interconnecting structure for rotor blading of an axial flow turbo-machine of the type wherein the blades of a circular row include integral enlarged head portions establishing a cylindrical array of mutually abutting cover plates, said blade interconnecting structure comprising a cylindrical cover band surrounding said cylindrical array of cover plates, means providing a circumferential channel between said cover band and cover plates and which extends over a portion of the axial width of said cover plates, a pair of axially spaced circumferentially extending welding seams joining said cover band to said cylindrical array of cover plates, said welding seams being located respectively at each side of said circumferential channel, and means establishing circumferentially spaced axially extending openings through said welding seams in radial alignment with the abutting faces of the cover plates of adjacent blades, said openings reaching inwardly from the outer sides of said welding seams and terminating at and in communication with said circumferential channel.

2. Rotor blading interconnecting structure as defined in claim 1 wherein said circumferential channel projects axially into a part of each of said welding seams.

3. Rotor blading interconnecting structure as defined in claim 1 wherein said circumferential channel opens radially to the outer surface of said cover band.

4. Rotor blading interconnecting structure as defined in claim 1 wherein said circumferential channel is established between confronting spaced circumferential surfaces of said cover band and cover plates.

5. Rotor blading interconnecting structure as defined in claim 1 wherein said circumferentially spaced openings which extend axially through said welding seams also extend in a radial direction along the inner edges of said welding seams.

6. Rotor blading interconnecting structure as defined in claim 1 wherein said circumferentially spaced openings which extend axially through said welding seams are constituted by closed-wall slots.

7. Rotor blading interconnecting structure as defined in claim 1 wherein said circumferentially spaced openings which extend axially through said welding seams are constituted by recesses which open in a radially outer direction to the surface of said cover band.

References Cited

UNITED STATES PATENTS

| | | | |
|---|---|---|---|
| 1,165,005 | 12/1915 | Herr | 253—77 |
| 3,038,699 | 6/1962 | Kaplan | 253—78 |

MARTIN P. SCHWADRON, *Primary Examiner.*

EVERETTE A. POWELL, Jr., *Examiner.*